US 6,648,933 B2

(12) United States Patent
Lum et al.

(10) Patent No.: US 6,648,933 B2
(45) Date of Patent: Nov. 18, 2003

(54) POWDER COMPOSITION AND METHOD FOR POLISHING STONE

(76) Inventors: Wing Thye Lum, 26 Bayshore Road, #21-02 (SG), 469972; Whee Huat Tan, Apt. Blk. 404, #08-12, Bukit Batok West Avenue 7 (SG), 650404

( * ) Notice: Subject to any disclaimer, the term of this patent is extended or adjusted under 35 U.S.C. 154(b) by 0 days.

(21) Appl. No.: 10/143,131

(22) Filed: May 10, 2002

(65) Prior Publication Data

US 2003/0041527 A1 Mar. 6, 2003

Related U.S. Application Data

(63) Continuation-in-part of application No. 09/729,887, filed on Dec. 4, 2000, now Pat. No. 6,409,782.

(51) Int. Cl.[7] .............................. C09K 3/14; C09G 1/02; C09G 1/04; B24B 1/00
(52) U.S. Cl. ............................... 51/309; 51/307; 106/3; 106/10; 451/41; 510/240; 216/30; 216/89; 216/90; 216/96
(58) Field of Search ....................... 51/309, 307; 106/3, 106/10; 451/41; 510/240; 75/255; 216/30, 89, 90, 96

(56) References Cited

U.S. PATENT DOCUMENTS

| 4,898,598 | A | * | 2/1990 | Zapata | 51/309 |
| 5,123,958 | A | * | 6/1992 | Wiand | 106/3 |
| 5,462,568 | A | * | 10/1995 | Donatelli, Jr. | 51/309 |
| 6,409,782 | B2 | * | 6/2002 | Lum et al. | 51/309 |

* cited by examiner

Primary Examiner—Michael Marcheschi
(74) Attorney, Agent, or Firm—Rutan & Tucker; Robert D. Fish

(57) ABSTRACT

Powder composition and method for polishing stone. The present invention relates to a powder composition and to a method for polishing stone, in particular granite, said method making use of said powder composition.

26 Claims, No Drawings

POWDER COMPOSITION AND METHOD FOR POLISHING STONE

This application is a CIP of allowed U.S. application Ser. No. 09/729,887, which was filed on Dec. 4, 2000 now U.S. Pat. No. 6,409,782 and also claims priority to Singapore Patent Application number 9906210-1, which was filed on Dec. 9, 1999, both of which are incorporated herein by reference in their entirety.

FIELD OF THE INVENTION

The present invention refers to a powder composition and to a method for polishing stone, in particular granite, said method making use of said powder composition.

BACKGROUND OF THE INVENTION

Compounds and methods for polishing stone are known in the state of art. For, example, U.S. Pat. No. 4,898,598 discloses a method for a polishing stone wherein the compound is a mixture of metallic oxides, a resin and a prepared gel, which compound is utilized in conjunction with sandpaper of varying grits to provide a smooth high gloss finish to the cut, rough-edged stone or marble.

U.S. Pat. No. 5,104,421 refers to a polishing method and abrasive pads, wherein the pad is manufactured with an abrasive such as alumina, zirconium oxide, tin oxide and cerium oxide, a kind of crater-soluble cellulose ether and a kind of a solubilising agent. The substances above are blended and coated on a sheet-like substrate and, in the polishing process, only water is put between the rotating abrasive pads and the goods to be polished.

U.S. Pat. No. 5,462,568 discloses a universal stone polishing composition which includes an abrasive constituent and a composition which is a source of group Ia or group IIa metal ions when mixed with water.

A further composition and a method for polishing stone are disclosed in U.S. Pat. No. 5,551,960. According to said U.S. patent, use is made of an abrasive article suitable for refining stone comprising an abrasive composite bonded to a backing, wherein the abrasive particles are dispersed in a binder.

Similarly, U.S. Pat. No. 5,942,015 discloses abrasive slurries, abrasive and articles made from the abrasive slurries. Furthermore, methods for the production of the abrasive articles are disclosed. The abrasive slurries and abrasive articles made therefrom comprise at least two grades of abrasive particles, i.e., a first larger grade and a second smaller grade wherein the abrasive grades have a medium particle size ratio of about 2 where the medium particle size ratio equals of the medium particle size of a larger grade of abrasive particles divided by the medium particle size of any smaller grade of abrasive particles.

The abrasive compositions according the state of art have the disadvantages that most of the abrasive particles have to be dispersed in a binder and to be coated onto a backing which is then placed on a pad of a scrubbing machine. This process is time and cost consuming as the pads have to be replaced from time to time.

Furthermore, the methods for polishing stone, in particular granite, have been carried out in the state of art in a process comprising several steps, approximately 5 to 7 and making use of polishing pads having different grits from 30 to 3500 microns. At the beginning, a polishing pad with grits of 3500 microns, in the next step a polishing pad having smaller grits, and so on, until in the last step, a polishing pad having grits having 30 to 100 microns are used to obtain a glossy surface again. As it can be taken from the afore, a lot of process steps are necessary in order to obtain satisfying results for the polished surface.

Therefore, it is along existing need for an improved process and an improved composition for polishing stone, in particular granite, which allows a more rapid polishing process.

DETAILED DESCRIPTION

The inventors of the present invention surprisingly found that a powder composition of stannic oxide and a nickel-iron alloy can be used for obtaining superior results when being used in the inventive polishing method merely comprising two process steps.

The present invention is therefore directed to a powder composition comprising 10 to 40% by weight stannic oxide particles having a average particle size (D50 micron) of 1 to 10 $\mu$m, preferably 2,5–4,0 $\mu$m and 60 to 90% by weight of a stainless steel powder, having an apparent density of 4,5–5,0, preferably 4,7 kg/dm$^3$ and particle size of less than 0,5 mm, preferably less than 0.2 mm.

Preferably, the inventive powder composition comprises 20 to 30, most preferred 25% by weight stannic oxide parties having a average particle size (D50 micron) of 2,5–4,0 $\mu$m and 70 to 80, most preferred 75% by weight of a stainless steel powder having an apparent density of 4,7 kg/dm$^3$ and a particle size of less than 0.2 mm.

In one embodiment, the inventive powder further comprises 0.01 to 20%, preferably 0.1 to 10.0%, by weight of a powder wax related to the total weight of the stannic oxide particles sand the stainless steel powder. The powder wax or resin used in the composition can be a natural wax, a synthetic wax or a mixture thereof and is preferably present in a micronized form. Examples for suitable natural or synthetic waxes/resins are petroleum wax, paraffin wax, polyethylene (PE) wax, polytetrafluoroethylene (PTFE) wax, beeswax, canauba wax or any mixture thereof. In a preferred embodiment, the powder wax is polytetrafluoroethylene wax. Preferably, the polytetrafluoroethylene wax is comprised in an amount of 0.1 to 1.0%, more preferably 0.1 to 0.5%, by weight related to the total weight of the stannic oxide particles and the stainless steel powder.

The inventors have found that incorporation of a powder wax or resin as set forth above in a percentage of 0.01 to. 20% by weight related to the total weight of the stannic oxide particles and the stainless steel powder surprisingly improves the gloss reading of a granite/stone surface from reading of 65°–75° (measured with a Gloss meter at an angle of 600) by 10°–20° to 80°–95° for black granite. Thus, this embodiment of the inventive powder composition is particularly suited for polishing of surfaces comprising of black granite or consisting thereof, however, it is not limited to this purpose.

For clarity reasons, it should be noted that the term "total weight of the stannic oxide particles and the stainless steel powder" means the weight of the stannic oxide particles plus the weight of the stainless steel powder present in the composition of the invention. Thus, the weight percentages of the powder wax present in the inventive composition can be expressed by $$\text{weight \% of powder wax} = \frac{\text{Weight of micronized powder wax}}{\text{Weight of stannic oxide} + \text{Weight of stainless steel}} \times 100\%$$

Likewise, the weight of oxalic acid, which can be present in further embodiments described below, can be expressed by $$\text{weight \% of oxalic acid} = \frac{\text{Weight of oxalic acid}}{\text{Weight of stannic oxide} + \text{Weight of stainless steel}} \times 100\%$$

It should also be noted in this respect that the percentages of 7.0 to 40% by weight of the stannic oxide particles to 60 to 90% by weight of a stainless steel powder refers only to the mixing ratio of these two components in the inventive composition and not to the percentage of these two components with respect to further components of the inventive composition.

In a further embodiment of the invention, the powder composition comprise sin addition to the stannic oxide particles and the stainless steel powder as defined above 1 to 10% by weight of oxalic acid related to the total weight of the stannic oxide particles and the stainless steel powder. Preferably, the oxalic acid is present as a powder. The inventors have found that by introducing oxalic acid into the composition of the invention the colour of black granite will become darker than without adding this chemical. Therefore, also this embodiment o£ the composition of the invention is particularly useful for polishing black granite surfaces.

In addition, the inventors have discovered that by including both a micronized wax powder and oxalic acid the granite surface colour improved as well as the gloss. The meter reading for measuring the gloss which resulted from application from a composition comprising both wax powder and oxalic acid compared to a composition which merely comprised stannic oxide particles and stainless steel powder increases by about 10 to 20 points.

Accordingly, the powder composition of the invention comprises in a further embodiment: 10 to 40% by weight of stannic oxide particles having an average particle size (D50 micron) of 1 to 10 μm, 60 to 90% by weight of a stainless steel powder having an apparent density of 4.5 to 5.0 kg/dm³ and a particle size of less than 0.5 mm, 0.01 to 20% by weight of a powder wax related to the total weight of the stannic oxide particles and the stainless steel powder, and 1 to 1 0% by weight of oxalic acid related to the total weight of the stannic oxide particles and the stainless steel powder—Also this composition is preferably used for polishing surfaces comprising black granite, however, it is not limited thereto.

If the inventive powder composition is used for polishing granite having a specific colour, the composition may additionally contain a colouring agent or pigment in order to assist in refreshing the colour of the granite during polishing. Said colouring agent or pigment may be added in an amount of up to 20% by weight of the composition. For example, said latter powder composition may have the following components:

| | |
|---|---|
| Stannic Oxide | 2 parts |
| Stainless Steel Shot/powder | 7 parts |
| Powder Wax | 1 part |
| Colour: | |
| for Black/Red | 2 parts |
| for White/Grey | 1 part |

The powder composition of the invention can comprise additional components to the one mentioned above. In one embodiment, the powder composition comprises, for example, also at least one surfactant.

The inventive powder composition is prepared, for example, by mixing the stannic oxide with the stainless steel powder first in a mixing vessel according to the above formulation for the two components, and then including the additional component(s) into this mixture. Important properties of the inventive powder mixture are the particle sizes of these two components (stannic oxide, stainless steel powder) in the mixture in order to obtain the results of the inventive polishing process.

Preferably, the stannic oxide particles have the following composition:

| | |
|---|---|
| Purity (% min.) | 99.0 |
| Fe$_2$O$_3$ (% min.) | 0.05 |
| Pb (% min.) | 0.05 |
| As (% min.) | 0.05 |
| Loss on Ignition (% min.) | 1.0 |
| Average Particle Size (D50 micron) | 2.5–4.0 |

According to the invention, the stainless steel powder is made from a nickel-iron alloy and has spherical grains. The powder has preferably an apparent density of 4,7 kg/dm³. The particle size of the stainless steel powder is measured by sieving through a sieve of 0,5 mm, preferably 0,2 mm, wherein at least 9596 of the powder particles pass through the sieve—

The inventive powder composition can be used in the inventive method for polishing stone and in particular for polishing granite, and particularly preferred black granite.

In the first step of the inventive process, in order to hone or smoothen the surface of granite, a 10 inch to 20 inch, preferably a 17 inch pad driver is needed for holding 3 to 5 small pad holders for the 3 inch to 5 inch metal bond diamond disc. Preferably, each metal bond diamond disc is coated with particles of 5 to 100 microns which are used for resurfacing or smoothen the surface with any size or kind of floor machine with a speed of 150 to 300 rpm.

Said pad holder can be attached to any size of scrubbing machine of 10 inch to 20 inch to be operated with a speed of 150 rpm to 500 rpm. Preferably, a 17 inch scrubbing machine operated with 300 rpm is used.

After honing the surface of Be granite in a first step, the inventive powder composition is sprinkled on the granite floor in the second step, and water is put onto the powder composition, preferably three ounces of water per 2 ounces of the inventive powder composition.

Thereafter, a white standard pad, made from Nylon or Polyester, is used to fit into any Standard floor scrubbing machine or Stone Grinder after removing the diamond disc. Following, the inventive powder composition is worked against the floor using the so equipped scrubbing machine with a rotation speed of 150–300 rpm. The purpose of the white pad is to hold the powder in place on the granite.

Then, the surface of the granite is slowly scrubbed for 1 to 2 minutes per square feet, this means, an area of 12 square feet which is treated for 2 minutes per square feet is treated for 24 minutes in total. If, during the scrubbing process, the floor dries up before the end of said two minutes, water is again added and scrubbing is continued until the glossy surface appears.

The result of a polishing process is measured on a gloss meter reading at 65 to 75 degrees for the surface treated according to the invention. It should be noted that a new granite surface has an average of 85 to 80 degrees whereas a hairline scratched surface of the grate floor has 4 degrees.

What is claimed is:

1. A stone polishing composition comprising:
   10 to 40% by weight of stannic oxide particles having an average particle size (D50 micron) of 1 to 10 $\mu$m, and
   60 to 90% by weight of a stainless steel powder having an apparent density of 4.5 to 5.0 kg/dm$^3$ and a particle size of less than 0.5 mm, and
   0.01 to 20% by weight of a powder wax related to the total weight of the stannic oxide particles and the stainless steel powder.

2. The composition of claim 1, wherein the powder wax is a natural wax, a synthetic wax or a mixture thereof.

3. The composition of claim 1 or 2, wherein the powder wax is selected from the group consisting of petroleum wax, paraffin wax, polyethylene wax, polytetrafluoroethylene wax, beeswax, canauba wax or mixtures thereof.

4. The composition of claim 3, wherein the powder wax is polytetrafluoroethylene wax.

5. The composition of claim 4, comprising the polytetrafluoroethylene wax in an amount of 0.1 to 1.0% by weight related of the stannic oxide particles and the stainless steel powder.

6. The composition according to claim 1, wherein the stannic oxide particles have an average particle size (D50 micron) of 2.5–4.0 $\mu$m.

7. The composition according to claim 1, wherein the stainless steel powder has an apparent density of 4.7 kg/dm$^3$ and a particle size of less than 0.2 mm.

8. The composition according to claim 1, additionally comprising at least one colouring agent for pigment in an amount of up to 20% by weight of the composition.

9. The composition according to claim 1, additionally comprising at least one surfactant.

10. A stone polishing composition comprising:
    10 to 40% by weight of stannic oxide particles having an average particle size (D50 micron) of 1 to 10 $\mu$m, and
    60 to 90% by weight of a stainless steel powder having an apparent density of 4.5 to 5.0 kg/dm$^3$ and a particle size of less than 0.5 mm, and
    1 to 10% by weight of oxalic acid related to the total weight of the stannic oxide particles and the stainless steel powder.

11. The composition of claim 10, wherein the oxalic acid is a powder.

12. A stone polishing composition comprising:
    10 to 40% by weight of stannic oxide particles having an average particle size (D50 micron) of 1 to 10 $\mu$m
    60 to 90% by weight of a stainless steel powder having an apparent density of 4.5 to 5.0 kg/dm$^3$ and a particle size of less than 0.5 mm,
    0.01 to 20% by weight of a powder wax related to the total weight of the stannic oxide particles and the stainless steel powder, and 1 to 10% by weight of oxalic acid related to the total weight of the stannic oxide particles and the stainless steel powder.

13. The composition according to claim 10 or 12, wherein the stannic oxide particles have an average particle size (D50 micron) of 2.5–4.0 $\mu$m.

14. The composition according to claim 10 or 12, wherein the stainless steel powder has an apparent density of 4.7 kg/dm$^3$ and a particle size of less than 0.2 mm.

15. The composition according to claim 10 or 12, additionally comprising at least one colouring agent or pigment in an amount of up to 20% by weight of the composition.

16. The composition according to claim 10 or 12, additionally comprising at least one surfactant.

17. A method for polishing a stone or granite surface comprising the steps of:
    a) applying a polishing powder composition comprising:
       10 to 40% by weight stannic oxide particles having an average particle size (D50 micron) of 1 to 10 $\mu$m; and
       60 to 90% by weight of a stainless steel powder having an apparent density of 4.7 kg/dm$^3$ and particle size of less than 0.5 mm; and
       0.01 to 20% by weight of a powder wax related to the total weight of the stannic oxide particles and the stainless steel powder;
    b) supplying water on said powder composition;
    c) working said composition against said surface for a period of time sufficient to obtain a glossy surface.

18. The method according to claim 17, wherein the stannic oxide particles have an average particle size (D50 micron) of 2.5–4.0 $\mu$m.

19. The method according to claim 17, wherein the stainless steel powder has a particle size of less than 0.2 mm.

20. The method according to claim 17, wherein the working step c) is carried out by using a standard floor scrubbing machine, preferably being operated with 175 to 300 rpm and having a 17 to 20 inch pad size.

21. The method according to claim 17 additionally comprising the step of pre-honing the surface of the stone, in particular granite before applying the powder composition to the surface wherein the honing is achieved by using a standard floor scrubbing machine, preferably being operated with 175 to 300 rpm and having a 17 to 20 inch pad size.

22. The method according to claim 17, wherein the granite surface comprises black granite.

23. A method for polishing a stone or granite surface comprising the steps of:
    a) applying a polishing powder composition comprising:
       10 to 40% by weight stannic oxide particles having an average particle size (D50 micron) of 1 to 10 $\mu$m, and
       60 to 90% by weight of a stainless steel powder having an apparent density of 4.7 kg/dm$^3$ and particle size of less than 0.5 mm, and
       1 to 10% by weight of oxalic acid related to the total weight of the stannic oxide particles and the stainless steel powder;
    b) supplying water on said powder composition;
    c) working said composition against said surface for a period of time sufficient to obtain a glossy surface.

24. The method of claim 23, wherein the oxalic acid is a powder.

25. A method for polishing a stone or granite surface comprising the steps of:
   a) applying a polishing powder composition comprising:
      10 to 40% by weight stannic oxide particles having an average particle size (D50 micron) of 1 to 10 µm, and
      60 to 90% by weight of a stainless steel powder having an apparent density of 4.7 kg/dm$^3$ and particle size of less than 0.5 mm;
      0.01 to 20% by weight of a powder wax related to the total weight of the stannic oxide particles and the stainless steel powder, and
      1 to 10% by weight of oxalic acid related to the total weight of the stannic oxide particles and the stainless steel powder;
   b) supplying water on said powder composition;
   c) working said composition against said surface for a period of time sufficient to obtain a glossy surface.

26. The method of claim 23 or 25, wherein the granite surface comprises black granite.

* * * * *